United States Patent
Jamison et al.

(10) Patent No.: US 9,410,065 B2
(45) Date of Patent: *Aug. 9, 2016

(54) PRECIPITATED PARTICLES AND WELLBORE FLUIDS AND METHODS RELATING THERETO

(71) Applicant: Halliburton Energy Services, Inc., Houston, TX (US)

(72) Inventors: Dale E. Jamison, Houston, TX (US); Charles Landis, Houston, TX (US); Jay Deville, Houston, TX (US); Cato McDaniel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/752,697

(22) Filed: Jan. 29, 2013

(65) Prior Publication Data

US 2014/0209386 A1 Jul. 31, 2014

(51) Int. Cl.
*E21B 21/00* (2006.01)
*C09K 8/32* (2006.01)
*C09K 8/03* (2006.01)
*C04B 20/00* (2006.01)
*C09K 8/48* (2006.01)

(52) U.S. Cl.
CPC ............ *C09K 8/032* (2013.01); *C04B 20/0008* (2013.01); *C09K 8/48* (2013.01); *E21B 21/00* (2013.01)

(58) Field of Classification Search
None
See application file for complete search history.

(56) References Cited

U.S. PATENT DOCUMENTS

| | | | |
|---|---|---|---|
| 3,164,215 A * | 1/1965 | Johnson | 175/261 |
| 4,508,628 A * | 4/1985 | Walker et al. | 507/129 |
| 4,584,327 A | 4/1986 | Sutton | |
| 4,585,064 A | 4/1986 | Graham et al. | |
| 4,670,501 A | 6/1987 | Dymond et al. | |
| 5,216,050 A | 6/1993 | Sinclair | |
| 5,249,627 A | 10/1993 | Harms et al. | |

(Continued)

FOREIGN PATENT DOCUMENTS

| | | |
|---|---|---|
| EP | 0119745 A2 | 9/1984 |
| EP | 0354609 A1 | 2/1990 |

(Continued)

OTHER PUBLICATIONS

Qi et al., "Crystal Design of Barium Sulfate Using Double-Hydrophilic Block Copolymers," Angew. Chem, Int. Ed. 2000, 39, No. 3.

(Continued)

*Primary Examiner* — Angela M DiTrani
*Assistant Examiner* — Anuradha Ahuja
(74) *Attorney, Agent, or Firm* — McDermott Will & Emery LLP; Craig Roddy

(57) ABSTRACT

A method of using precipitated particles in a wellbore may comprise circulating a wellbore fluid in a wellbore penetrating a subterranean formation, the wellbore fluid having a density of about 7 ppg to about 50 ppg and comprising a base fluid and a plurality of precipitated particles having a shape selected from the group consisting of ovular, substantially ovular, discus, platelet, flake, toroidal, dendritic, acicular, spiked with a substantially spherical or ovular shape, spiked with a discus or platelet shape, rod-like, fibrous, polygonal, faceted, star shaped, and any hybrid thereof.

14 Claims, 1 Drawing Sheet

(56) References Cited

U.S. PATENT DOCUMENTS

| | | | |
|---|---|---|---|
| 5,639,715 A | 6/1997 | Patel | |
| 5,707,939 A | 1/1998 | Patel | |
| 5,716,910 A | 2/1998 | Totten et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,905,061 A | 5/1999 | Patel | |
| 5,909,779 A | 6/1999 | Patel et al. | |
| 5,977,031 A | 11/1999 | Patel | |
| 6,036,870 A | 3/2000 | Briant et al. | |
| 6,143,065 A * | 11/2000 | Freeman et al. | 106/464 |
| 6,170,577 B1 | 1/2001 | Noles, Jr. et al. | |
| 6,248,698 B1 | 6/2001 | Mullen et al. | |
| 6,287,639 B1 | 9/2001 | Schmidt et al. | |
| 6,311,773 B1 | 11/2001 | Todd et al. | |
| 6,439,309 B1 | 8/2002 | Matherly et al. | |
| 6,548,452 B1 | 4/2003 | Nattier et al. | |
| 6,582,819 B2 | 6/2003 | McDaniel et al. | |
| 6,586,372 B1 | 7/2003 | Bradbury et al. | |
| 6,609,578 B2 | 8/2003 | Patel et al. | |
| 6,677,426 B2 | 1/2004 | Noro et al. | |
| 6,828,279 B2 | 12/2004 | Patel et al. | |
| 6,857,485 B2 | 2/2005 | Patel et al. | |
| 6,968,898 B2 | 11/2005 | Todd et al. | |
| 7,048,054 B2 | 5/2006 | Heathman et al. | |
| 7,131,491 B2 | 11/2006 | Blauch et al. | |
| 7,147,067 B2 | 12/2006 | Getzlaf et al. | |
| 7,153,575 B2 | 12/2006 | Anderson et al. | |
| 7,169,738 B2 | 1/2007 | Massam et al. | |
| 7,176,165 B2 | 2/2007 | Massam et al. | |
| 7,220,707 B2 | 5/2007 | Massam et al. | |
| 7,238,331 B2 * | 7/2007 | Zhou et al. | 423/1 |
| 7,331,391 B2 | 2/2008 | Keese et al. | |
| 7,350,579 B2 | 4/2008 | Gatlin et al. | |
| 7,370,820 B2 | 5/2008 | Browne et al. | |
| 7,392,847 B2 | 7/2008 | Gatlin et al. | |
| 7,409,994 B2 | 8/2008 | Massam et al. | |
| 7,449,431 B2 | 11/2008 | Bradbury et al. | |
| 7,534,745 B2 | 5/2009 | Taylor et al. | |
| 7,589,049 B2 | 9/2009 | Bradbury et al. | |
| 7,618,927 B2 | 11/2009 | Massam et al. | |
| 7,645,723 B2 | 1/2010 | Kirsner et al. | |
| 7,651,040 B2 | 1/2010 | Bradbury et al. | |
| 7,651,983 B2 | 1/2010 | Massam et al. | |
| 7,673,686 B2 | 3/2010 | Nguyen et al. | |
| 7,677,332 B2 | 3/2010 | Spiecker et al. | |
| 7,696,131 B2 | 4/2010 | Oyler et al. | |
| 7,727,939 B2 | 6/2010 | Bradbury et al. | |
| 7,745,380 B2 | 6/2010 | Bradbury et al. | |
| 7,819,192 B2 | 10/2010 | Weaver et al. | |
| 7,825,074 B2 | 11/2010 | Schmidt et al. | |
| 7,956,017 B2 | 6/2011 | Gatlin et al. | |
| 8,003,579 B2 | 8/2011 | Akarsu et al. | |
| 8,076,271 B2 | 12/2011 | Blauch et al. | |
| 8,105,984 B2 | 1/2012 | Quiroga et al. | |
| 8,136,595 B2 | 3/2012 | Weaver et al. | |
| 8,168,569 B2 | 5/2012 | Ballard et al. | |
| 8,168,739 B2 | 5/2012 | Kitamura et al. | |
| 8,193,124 B2 | 6/2012 | Mettath et al. | |
| 8,227,382 B2 | 7/2012 | Dakin et al. | |
| 8,252,729 B2 | 8/2012 | Zhang | |
| 8,261,833 B2 | 9/2012 | Nguyen et al. | |
| 8,309,497 B1 | 11/2012 | Zhang | |
| 2003/0203822 A1 | 10/2003 | Bradbury et al. | |
| 2004/0115123 A1* | 6/2004 | Zhou et al. | 423/598 |
| 2004/0127366 A1 | 7/2004 | Bradbury et al. | |
| 2005/0059557 A1 | 3/2005 | Todd et al. | |
| 2005/0082090 A1 | 4/2005 | Grainger et al. | |
| 2005/0277551 A1 | 12/2005 | Massam et al. | |
| 2005/0277552 A1 | 12/2005 | Massam et al. | |
| 2005/0277553 A1 | 12/2005 | Massam et al. | |
| 2006/0188651 A1 | 8/2006 | Bradbury et al. | |
| 2007/0105724 A1 | 5/2007 | Massam et al. | |
| 2007/0184987 A1 | 8/2007 | Brandbury et al. | |
| 2007/0281867 A1* | 12/2007 | Massam et al. | 507/200 |
| 2007/0287637 A1 | 12/2007 | Bradbury et al. | |
| 2007/0289781 A1 | 12/2007 | Rickman et al. | |
| 2008/0006405 A1 | 1/2008 | Rickman et al. | |
| 2008/0064613 A1 | 3/2008 | Massam | |
| 2008/0108528 A1 | 5/2008 | Matlock et al. | |
| 2008/0167203 A1 | 7/2008 | Bradbury et al. | |
| 2008/0169130 A1* | 7/2008 | Norman et al. | 175/65 |
| 2008/0226522 A1 | 9/2008 | McKee | |
| 2009/0186781 A1* | 7/2009 | Zhang | 507/140 |
| 2009/0192052 A1 | 7/2009 | Zhang | |
| 2009/0258799 A1* | 10/2009 | Hodder et al. | 507/140 |
| 2010/0009874 A1* | 1/2010 | Ballard et al. | 507/118 |
| 2010/0160187 A1 | 6/2010 | Nguyen et al. | |
| 2010/0179281 A1 | 7/2010 | Nilsen | |
| 2010/0319921 A1 | 12/2010 | Eia et al. | |
| 2011/0039737 A1 | 2/2011 | Schmidt et al. | |
| 2011/0098394 A1 | 4/2011 | Schmeltzer et al. | |
| 2011/0136701 A1 | 6/2011 | Prebensen et al. | |
| 2012/0186880 A1 | 7/2012 | Patel et al. | |
| 2012/0202718 A1 | 8/2012 | Ballard et al. | |
| 2012/0211227 A1 | 8/2012 | Thaemlitz et al. | |
| 2014/0209393 A1 | 7/2014 | Jamison et al. | |

FOREIGN PATENT DOCUMENTS

| | | |
|---|---|---|
| EP | 1600486 A2 | 11/2005 |
| EP | 1600487 A2 | 11/2005 |
| EP | 1600488 A2 | 11/2005 |
| EP | 1600489 A2 | 11/2005 |
| EP | 1626077 A2 | 2/2006 |
| WO | 2005118742 A2 | 12/2005 |
| WO | 2006083757 A2 | 8/2006 |
| WO | 2007145733 A1 | 12/2007 |
| WO | 2008033592 A1 | 3/2008 |
| WO | 2009090371 A1 | 7/2009 |
| WO | 2014120458 A1 | 8/2014 |
| WO | 2014189584 A1 | 11/2014 |

OTHER PUBLICATIONS

Paytan et al., "Origin of Marine Barite Deposits: Sr and S Isotope Characterization," Department of Geological and Environmental Sciences, Stanford University, Stanford, CA, 2002.

Jones et al., "Effect of Solution Silicate on the Precipitation of Barium Sulfate," Cryst. Growth Des., 2012, 12 (6), pp. 3057-3065.

Yang et al., "Dextran-Controlled Crystallization of Silver Microcrystals with Novel Morphologies," Crystal Growth & Design, 2004, vol. 4, No. 6, 1371-1375.

Zhang et al., "Morphological Control of Calcium Oxalate Dihydrate by a Double-Hydrophilic Block Copolymer," Chem. Mater. 2002, 14, 2450-2457.

Borah, et al., "Low-Molecular-Weight Poly-Carboxylate as Crystal Growth Modifier in Biomineralization," J. Chem. Sci., vol. 118, No. 6, Nov. 2006, pp. 519-524.

Pinna et al., "Magnetite Nanocrystals: Nonaqueous Synthesis, Characterization, and Solubility," Chem. Mater. 2005, 17, 3044-3049.

Yan et al., "Hydrogen Peroxide as a Crystal Growth Modifier of $CaCo_3$," CrystEngComm, 2012, 14, 2046.

Su et al., "Antibacterial Property and Mechanism of a Novel Pu-erh Tea Nanofibrous Membrane," Appl. Microbiol Biotechnol (2012), 93:1663-1671.

Cölfen, Helmut, "Double-Hydrophilic Block Copolymers: Synthesis and Application as Novel Surfactants and Crystal Growth Modifiers," Macromol. Rapid Commun. 2001, 22, 219-252.

Jones et al., "Controlling Crystal Growth with Modifiers," CrystEngComm, 2010, 12, 1016-1023.

Jones et al., "Controlling Crystal Growth with Modifiers," not dated.

Kadota et al., "Influence of Habit Modifiers on Particle Shape in a Crystallization Process," KONA No. 24 (2006).

Radanovic-Guzvica, Biserka, "The Average Structural Density of Barite Crystals of Different Habit Types," Department of Mineralogy and Petrography, Croatian Natural History Museum, Demetrova 1, 10000 Zagreb, Croatia, not dated.

Kawaguchi et al., "Crystallization of Inorganic Compounds in Polymer Solutions. Part I: Control of Shape and Form of Calcium Carbonate," Colloid Polym Sci 270:1176-1181 (1992).

(56) References Cited

OTHER PUBLICATIONS

Williams et al., "Effect of Polyelectrolytes on the Precipitaton of Calcium Carbonate," The Monsanto Chemical Company, Chemical Research Department, Research and Engineering Division, vol. 70, pp. 4898-4900, 1957.

Qi et al., "Control of Barite Morphology by Double-Hydrophilic Block Copolymers," Chem. Mater. 2000, 12, 2392-2403.

International Search Report and Written Opinion for PCT/US2014/011844 dated May 14, 2014.

International Search Report and Written Opinion for PCT/US2014/019818 dated Jun. 27, 2014.

* cited by examiner

PRECIPITATED PARTICLES AND WELLBORE FLUIDS AND METHODS RELATING THERETO

BACKGROUND

The present invention relates to precipitated particles and wellbore fluids and methods relating thereto.

In the exploration and recovery of hydrocarbons from subterranean formations, a variety of wellbore operations are performed, e.g., drilling operations, cementing operations, and stimulation operations. One physical property of the wellbore fluids used in conjunction with these wellbore operations is density. For example during drilling operations, the density of a wellbore fluid must be carefully controlled so as to exert sufficient pressure to stabilize the walls of the wellbore, e.g., to prevent blowouts, while simultaneously not exerting excess pressure that can cause damage to the surrounding subterranean formation. In another example, the density of spacer fluids and cementing operations must be carefully balanced so as to minimize or prevent mixing of other wellbore fluids on either side of the spacer fluid (e.g., a drilling fluid and a cementing fluid).

Changing the density of wellbore fluids is often achieved with the use of particles (often referred to in the art as weighting agents). The characteristics of weighting agent particles (e.g., specific gravity and particle size distribution) effect not only the density of the wellbore fluid, but also other wellbore fluid properties, like sag and viscosity. The ability to tailor the properties of the weighting agent to achieve desired wellbore fluid characteristics may allow for reduced cost by minimizing the need for other additives because the tailored weighting agent can achieve the desired wellbore fluid characteristics. However, the grinding process used to produce weighting agents provides little tailorability in terms of particle characteristics.

The characteristics of the weighting agent particles (e.g., particle shape and particle size distribution) is primarily determined by the grinding procedure and the composition of the bulk mineral including any contaminants. In some instances, sieves can be used to remove at least some of the larger or smaller particle sizes from the ground material. However, this provides limited ability to tailor the average particle size and particle size distribution of the weighting agent particles. Moreover, the grind process offers no ability to tailor the shape and morphology of the weighting agent particles. Accordingly, methods that allow for the production of weighting agents with tailored characteristics and the methods that employ the resultant wellbore fluids would be of value to one in the art.

SUMMARY OF THE INVENTION

The present invention relates to precipitated particles and wellbore fluids and methods relating thereto.

One embodiment of the present invention is a method that comprises circulating a wellbore fluid in a wellbore penetrating a subterranean formation, the wellbore fluid having a density of about 7 ppg to about 50 ppg and comprising a base fluid and a plurality of precipitated particles having a shape selected from the group consisting of ovular, substantially ovular, discus, platelet, flake, toroidal, dendritic, acicular, spiked with a substantially spherical or ovular shape, spiked with a discus or platelet shape, rod-like, fibrous, polygonal, faceted, star shaped, and any hybrid thereof.

Another embodiment of the present invention is a wellbore fluid that comprises a base fluid; a plurality of precipitated particles having a shape selected from the group consisting of ovular, substantially ovular, discus, platelet, flake, toroidal, dendritic, acicular, spiked with a substantially spherical or ovular shape, spiked with a discus or platelet shape, rod-like, fibrous, polygonal, faceted, star shaped, and any hybrid thereof; and wherein the wellbore fluid has a density of about 7 ppg to about 50 ppg.

Yet another embodiment of the present invention is a wellbore fluid that comprises a base fluid; a plurality of first precipitated particles formed by precipitation and having a shape selected from the group consisting of ovular, substantially ovular, discus, platelet, flake, toroidal, dendritic, acicular, spiked with a substantially spherical or ovular shape, spiked with a discus or platelet shape, rod-like, fibrous, polygonal, faceted, star shaped, and any hybrid thereof; a plurality of second particles, the second particles being precipitated or non-precipitated; wherein the wellbore fluid has a density of about 7 ppg to about 50 ppg; and wherein the first precipitated particles in combination with the second particles have a multiparticle specific gravity of about 3 to about 20. The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
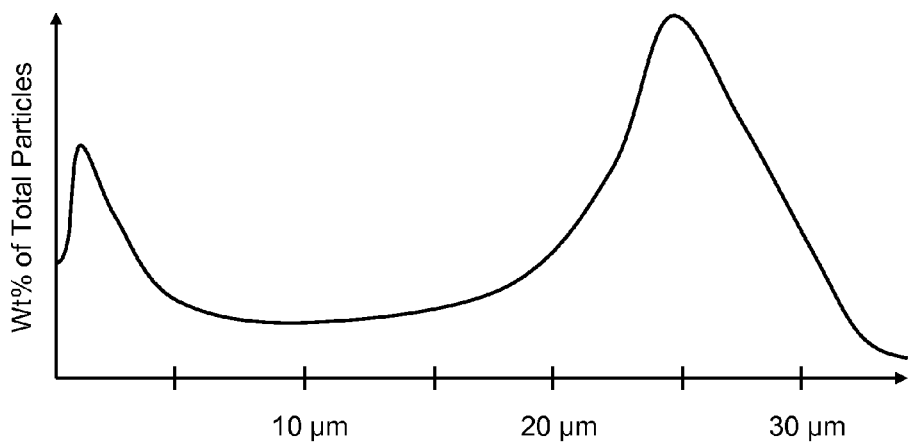
FIGS. 1A-B illustrate examples of theoretical multi-modal diameter distributions for particles.

The present invention relates to precipitated particles and wellbore fluids and methods relating thereto.

The present invention provides for, in some embodiments, precipitated particles that can be used in subterranean applications as unique weighting agents. Precipitated particle characteristics like shape and particle size distribution may, in some embodiments, be tailored during precipitation synthesis, for example, through pH and/or temperature. Further, precipitation as a synthesis method may allow for unique shapes and narrow particle size distributions that can be exploited so as to achieve desired properties and capabilities in the corresponding wellbore fluids (e.g., density, viscosity, and sag control). For example, discus or platelet shaped precipitated particles may increase the viscosity of a wellbore fluid and settle in the wellbore fluid at a slower rate, thereby yielding a viscosified fluid with less sag.

The ability to tailor the properties and capabilities of wellbore fluids may advantageously allow for the a reduction in other, potentially expensive and less environmentally-desirable, additives because the characteristics of the precipitated particles provide for the desired properties and capabilities of the wellbore fluid.

Further, the purity of the precipitated particles may be utilized to bring mined or ground weighting agents into an acceptable specification. For example, some grades of mined barite contain high levels of sand and other particles. Precipitated particles described herein may be combined with such ground barite to decrease the overall abrasiveness and increase specific gravity of the weighting agent additive. In other examples, ground minerals that are mined in some areas of the world may have higher levels of heavy metals like mercury or cadmium. The inclusion of the higher purity precipitated particles may dilute the contaminants to acceptable levels.

It should be noted that when "about" is used herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

It should be noted that unless otherwise specified, the term "precipitated particles" encompasses single types of precipitated particles and combinations of more than one type of particle, including combinations of precipitated particles with non-precipitated particles. Distinctions between types of precipitated particles may, in some embodiments, be defined by at least one of composition, shape, median diameter, aspect ratio, diameter distribution, presence or absence of coating, coating composition, and the like, and any combination thereof.

In some embodiments, the precipitated particles described herein may be formed by precipitation methods. The precipitation methods may advantageously yield precipitated particles that have desired characteristics (e.g., size, shape, diameter distribution, median diameter, and the like).

Some embodiments of the present invention may involve precipitating particles from two or more salts in aqueous solutions so as to yield the precipitated particles described herein (or precursors to precipitated particles described herein, e.g., particles that can be further calcined to yield precipitated particles described herein). For example, some embodiments of the present invention may involve precipitating manganese carbonate from manganese (II) salts in aqueous solutions with alkali metal carbonates so as to yield the precipitated manganese carbonate particles. Examples of other salts that may be used in producing precipitated particles may include salts (e.g., fluorides, chlorides, bromides, iodides, acetates, formates, citrates, sulfates, carbonates, hydroxides, phosphates, silicates, molybdates, tungstates, vanadates, titanates, chromates, and the like) of barium, bismuth, chromium, cobalt, copper, gold, iron, lead, nickel, strontium, tin, zinc, manganese, tungsten, aluminum, silver, cerium, magnesium, zirconium, titanium, calcium, antimony, lead, and the like, and any combination thereof.

In some embodiments, the concentration of salts used in the formation of precipitated particles may range from a lower limit of about 1 mM, 10 mM, or 50 mM to an upper limit of about 5 M, 1 M, or 100 mM, and wherein the concentration may range from any lower limit to any upper limit and encompasses any subset therebetween.

In some embodiments, the precipitated particles described herein that are formed by precipitation methods may comprise at least one of AgI, AgCl, AgBr, AgCuS, AgS, $Ag_2S$, $Al_2O_3$, AsSb, $AuTe_2$, $BaCO_3$, $BaSO_4$, $BaCrO_4$, BaO, BeO, BiOCl, $(BiO)_2CO_3$, $BiO_3$, $Bi_2S_3$, $Bi_2O_3$, CaO, $CaF_2$, $CaWO_4$, $CaCO_3$, $(Ca,Mg)CO_3$, CdS, CdTe, $Ce_2O_3$, CoAsS, $Cr_2O_3$, CuO, $Cu_2O$, CuS, $Cu_2S$, $CuS_2$, $Cu_9S_5$, $CuFeS_2$, $Cu_5FeS_4$, $CuS.Co_2S_3$, $Fe^{2+}Al_2O_4$, $Fe_2SiO_4$, $FeWO_4$, $FeAs_2$, FeAsS, $FeS$, $FeS_2$, $FeCO_3$, $Fe_2O_3$, $\alpha\text{-}Fe_2O_3$, $\alpha\text{-}FeO(OH)$, $Fe_3O_4$, $FeTiO_3$, HgS, $Hg_2Cl_2$, MgO, $MnCO_3$, $Mn_2S$, $MnWO_4$, MnO, $MnO_2$, $Mn_2O_3$, $Mn_3O_4$, $Mn_2O_7$, MnO(OH), $CaMoO_4$, $MoS_2$, $MoO_2$, $MoO_3$, $NbO_4$, NiO, $NiAs_2$, NiAs, NiAsS, NiS, PbTe, $PbSO_4$, $PbCrO_4$, $PbWO_4$, $PbCO_3$, $(PbCl)_2CO_3$, $Pb^{2+}_2Pb^{4+}O_4$, $Sb_2SnO_5$, $Sc_2O_3$, SnO, $SnO_2$, SrO, $SrCO_3$, $SrSO_4$, $TiO_2$, $UO_2$, $V_2O_3$, $VO_2$, $V_2O_5$, VaO, $Y_2O_3$, $YPO_4$, $ZnCO_3$, ZnO, $ZnFe_2O_4$, $ZnAl_2O_4$, ZnS, $ZrSiO_4$, $ZrO_2$, $ZrSiO_4$, and any combination thereof in discrete domains and/or a substantially homogeneous domain.

In some embodiments, combination of more than one salt may be used to form precipitated particles with two or more of the foregoing precipitates in substantially homogeneous domain. For example, strontium and barium salts may be utilized in forming precipitated particles that comprise $(Ba,Sr)SO_4$ or $(Ba,Sr)CO_3$. In another example, barium salts may be used in forming precipitated particles that comprise $Ba(SO_4,CrO_4)$. Examples of other substantially homogeneous domains may include, but are not limited to, suitable mixtures of barium, strontium, calcium, zinc, iron, cobalt, manganese, lead, tin, and the like, and any combination thereof in the form of sulfates, carbonates, hydroxide, oxides, sulfides, chromates and the like, and any combination thereof.

Some embodiments may involve forming precipitated particles with discrete domains that comprise at least one of the foregoing precipitates. For example, a calcium carbonate particle may be formed by precipitation and then barium salts added so as to precipitate barium carbonate on at least a portion of the surface of the calcium carbonate precipitated particle. In another example, a higher specific gravity composition like those comprising bismuth may be precipitated and then a different composition precipitated thereon. Precipitating a second composition on a first composition may allow for the first composition to be formed with a desired shape and the second composition to increase the specific gravity of the particle, which may allow for a desired higher specific gravity particle with a desired shape that may be difficult to achieve otherwise. In another example, the higher specific gravity particle may be the first composition and the second composition precipitated thereon may enable linking of the particles or reduce the abrasiveness of the particles (described further herein).

In some embodiments, the particles produced by precipitation may be calcined to yield precipitated particles described herein. Calcining may, inter alia, increase the mechanical properties (e.g., crush strength) of the precipitated particles, yield a corresponding oxide (e.g., manganese carbonate to manganese oxide, calcium carbonate to calcium oxide, bismuth carbonate to bismuth oxycarbonate or bismuth oxide, zirconium hydroxide to zirconium oxide, or magnesium hydroxide to magnesium oxide), or any combination thereof.

In some embodiments, the precipitated particles described herein may be shaped as spherical, ovular, substantially spherical, substantially ovular, discus, platelet, flake, toroidal (such as donut-shaped), dendritic, acicular, spiked with a substantially spherical or ovular shape (such as a sea urchin), spiked with a discus or platelet shape, rod-like, fibrous (such as high-aspect ratio shapes), polygonal (such as cubic or pyramidal), faceted (such as the shape of crystals), star or floral shaped (such as a tripod or tetrapod where rods or the like extend from a central point), or any hybrid thereof (e.g., a dumbbell-shape). For example, spherical, ovular, substantially spherical, and substantially ovular-shaped precipitated particles may be useful in producing wellbore fluids that are less abrasive to wellbore tools and/or decrease viscosity as compared to ground particles. In another example, platelet, flake, acicular, spiked with a discus or platelet shape, rod-like, and fibrous-shaped precipitated particles may be useful in producing wellbore fluids with less sag and/or greater viscosity as compared to ground particles.

It should be noted that as used herein, the terms "median diameter" and "diameter distribution" refers to a weight median diameter and a weight diameter distribution, respectively, wherein the diameter is based on the largest dimension of the particles. For example, rod-like particles would have diameter distributions and the like based on the length of the rod-like particles. As used herein, the term "median diameter" refers to a diameter distribution wherein 50% of the particles are smaller than a given value.

In some embodiments, the precipitated particles described herein may have a median diameter ranging from a lower limit of about 5 nm, 10 nm, 20 nm, 50 nm, 100 nm, 250 nm, 500 nm, or 1 micron to an upper limit of about 100 microns, 50 microns, 25 microns, 10 microns, 5 microns, 1 micron, or 750 nm, and wherein the median diameter may range from any lower limit to any upper limit and encompasses any subset therebetween. One of ordinary skill in the art should understand that precipitation methods may be used to yield larger sizes of particles that are millimeters or larger in size. For example, precipitated particles having a median diameter of about 1-10 mm may be used as proppants or lost circulation materials.

In some embodiments, the precipitated particles may be ground to achieve a desired size and/or shape. Methods that involve precipitation and then grinding may advantageously allow for production of higher purity precipitated particles as compared to particles produced by grinding bulk minerals. Further, such methods may allow for reduced cost while maintaining high purity as compared to some precipitation methods with steps to control particle size. In some instances, larger precipitated particles may be directly added to a mined mineral and undergo the same grinding process such that the ground product may have a higher purity than the mineral alone. For example, large particles of barium sulfate may formed by precipitation and added to mined barite with high levels of contaminants (e.g., greater than 15% sand) such that the ground product is higher purity, which yields a less abrasive, higher specific gravity weighting agent that is of greater value in the industry.

In some embodiments, the precipitated particles may have a narrow diameter distribution. That is, the diameter distribution (or at least one mode of a multimodal diameter distribution) may have a standard deviation of about 2% or less of the peak diameter for the given mode (e.g., about 0.1% to about 2% or any subset therebetween). In some embodiments, it is believed that precipitation methods may be advantageously employed to achieve narrow diameter distributions of precipitated particles described herein.

In some embodiments, the conditions under which the precipitated particles are formed may be manipulated so as to assist in controlling or directing the characteristics of the precipitated particles (e.g., shape, median diameter, diameter distribution, narrow diameter distribution, density, hardness, and the like). Examples of conditions that can be manipulated may include, but are not limited to, pH, temperature, chemical composition of morphology modifiers, concentration of morphology modifiers, concentration of the salts used in the production of the precipitated particles, and the like, and any combination thereof. For example, increasing the pH and/or temperature may increase the median diameter of the precipitated particles.

In some embodiments, forming precipitated particles may be at a pH ranging from a lower limit of about 2, 3, 4, 5, 7, or 8 to an upper limit of about 12, 11, 10, 9, 8, 7, or 6, and wherein the pH may range from any lower limit to any upper limit and encompasses any subset therebetween.

In some embodiments, forming precipitated particles may be at a temperature ranging from a lower limit of about 10° C., 20° C., 30° C., 40° C., or 50° C. to an upper limit of about 95° C., 90° C., 80° C., 70° C., or 60° C., and wherein the temperature may range from any lower limit to any upper limit and encompasses any subset therebetween.

As used herein, the term "morphology modifiers" refers to chemicals that are used during the formation of precipitated particles that effect the characteristics of the precipitated particles. Examples of morphology modifiers may include, but are not limited to, polymers, surfactants, electrolytes, hydrogen peroxide, silicates and other similar inorganic materials, aqueous-miscible organic liquids, and the like, and any combination thereof.

Without being limited by theory, it is believed that morphology modifiers may direct the formation of the precipitated particles in one of at least two ways. First, the morphology modifiers may form structures within the precipitation fluid that direct the growth of the precipitated particle. For example, block copolymers may form micelles in aqueous solutions (e.g., spherical micelles, rod-like micelles, worm-like micelles, and the like depending on, inter alia, concentration and pH) that direct the growth of the precipitated particles based on the size and shape of the micelles. Second, the morphology modifiers may interact directly with various portions of the surface of the precipitated particles so as to decrease or enhance growth of that portion of the surface. This may be most prevalent in the formation of precipitated particles with different crystalline lattice surfaces (e.g., (101) vs (100) surfaces). For example, the inclusion of electrolytes like citrate may diminish growth of the precipitated particle on at least one crystal surface so as to yield precipitated particles with rod-like or flake shapes.

In some instances, both of the foregoing factors may be involved. For example, by varying the acidic groups of the polyethylene imine (PEI) block of a polyethylene oxide-co-polyethylene imine (PEO-co-PEI), the shape of the resultant precipitated particles can be drastically altered, e.g., barium sulfate precipitated particles may be dumbbell-shaped when utilizing PEO-co-PEI-COOH, fibrous or needle-like with PEO-co-PEI-$PO_3H_2$, or floral-shaped with PEO-co-PEI-$SO_3H$ as compared to a faceted structure without the polymer.

Examples of polymers that may be useful as morphology modifiers may, in some embodiments, include, but are not limited to, peptides, PEO-co-PEI-$SO_3H$, PEO-co-PEI-COOH, PEO-co-PEI-$PO_3H_2$, PEO-co-polypropylene oxide (PPO), PPO-co-PEO-co-PPO, PEO-co-polyethylene (PE), PPO-co-poly(methacrylic acid) (PMAA), PEO-co-poly(2-vinylpyridine) (P2VP), P2VP-co-polyacrylic acid (PAA), PMMA-co-PAA, polystyrene sulfonate (PSS), PEO, PPO, PEI, PEI-$SO_3H$, PEI-COOH, PEI-$PO_3H_2$, PMAA, and the like, salts thereof where appropriate, any derivative thereof, and any combination thereof. Additional examples of polymers that may be useful as morphology modifiers may, in some embodiments, include, but are not limited to, homopolymers or copolymers of monomers selected from the group comprising: acrylic acid, itaconic acid, maleic acid or anhydride, hydroxypropyl acrylate vinylsulphonic acid, acrylamido 2-propane sulphonic acid, acrylamide, methacrylamide, hydrolyzed acrylamide, styrene sulphonic acid, acrylic phosphate esters, methyl vinyl ether, vinyl acetate, stearyl methacrylate, butylacrylate, vinyl pyrrolidone, glycols (ethylene glycol, propylene glycol, and butylene glycol), and the like, salts thereof where appropriate, any derivative thereof, and any combination thereof. Examples of commercially available polymers may include Pluronic® surfactants (polyethylene oxide-polypropylene oxide-polyethylene oxide tri-block polymers, available from BASF), Tetronic® surfactants (tetra-functional block copolymers based on ethylene oxide and propylene oxide, available from BASF), and the like, and any combination thereof. In some embodiments, when polymers are used in the formation of precipitated particles, the resultant particles may be at least partially coated with the polymers.

In some embodiments, molecular weight of the polymer may effect the characteristics of the resultant precipitated particle. For example, PSS polymers used in the synthesis of precipitated particles (e.g., carbonate particles) may be more spherical with higher molecular weight PSS. In some embodiments, the molecular weight of polymers used as morphology modifiers in the formation of precipitated particles may range from a lower limit of about 10,000 g/mol, 25,000 g/mol, 100,000 g/mol, or 250,000 g/mol to an upper limit of about 2,000,000 g/mol, 1,000,000 g/mol, 500,000 g/mol, or 250,000 g/mol, and wherein the molecular weight may range from any lower limit to any upper limit and encompasses any subset therebetween.

In some embodiments, the concentration of polymers used as morphology modifiers in the formation of precipitated particles may range from a lower limit of about 0.1 g/L, 1 g/L, or 5 g/L to an upper limit of about 100 g/L, 25 g/L, 10 g/L, or 5 g/L, and wherein the concentration may range from any lower limit to any upper limit and encompasses any subset therebetween.

Examples of surfactants that may be useful as morphology modifiers may, in some embodiments, include, but are not limited to, oleic acid, monobasic fatty acids, polybasic fatty acids, alkylbenzene sulfonic acids, alkane sulfonic acids, linear alpha-olefin sulfonic acid, phospholipids, betaines, and the like, salts thereof where appropriate, any derivative thereof, and any combination thereof. Examples of commercially available surfactants may include Brij® surfactants (ethoxylated fatty alcohols, available from Sigma-Aldrich), Triton® surfactants (ethoxylated fatty alkylphenols, available from Sigma-Aldrich), and the like, and any combination thereof.

In some embodiments, the concentration of surfactants used as morphology modifiers in the formation of precipitated particles may range from a lower limit of about 0.1 g/L, 1 g/L, or 5 g/L to an upper limit of about 100 g/L, 25 g/L, 10 g/L, or 5 g/L, and wherein the concentration may range from any lower limit to any upper limit and encompasses any subset therebetween.

Examples of aqueous-miscible organic liquids that may be useful as morphology modifiers may, in some embodiments, include, but are not limited to, acetone, dimethyl formamide, methanol, ethanol, n-propanol, isopropanol, n-butanol, sec-butanol, isobutanol, t-butanol, glycerol, pyridine, tetrahydrofuran, and the like.

In some embodiments, the concentration of aqueous-miscible organic liquids used as morphology modifiers in the formation of precipitated particles may range from a lower limit of about 1%, 10%, or 25% by volume of the precipitation fluid to an upper limit of about 98%, 75%, or 50% by volume of the precipitation fluid, and wherein the concentration may range from any lower limit to any upper limit and encompasses any subset therebetween.

In some embodiments, multiple morphology modifiers may be manipulated to achieve precipitated particles with desired characteristics. By way of nonlimiting example, hydrogen peroxide concentration and pH may be adjusted to change the surface of precipitated particles, e.g., with respect to calcium carbonate precipitated particles, higher pH values (e.g., about 11) and higher hydrogen peroxide concentrations may yield calcium carbonated precipitated particles with smaller faceted protrusions (or spikes) on the surface as compared to a lower pH (e.g., about 9) and lower hydrogen peroxide concentrations that may yield larger, smoother facets along the surface of the precipitated particle. Further, the precipitation time may be adjusted to allow for particle fusion to yield dumbbell or peanut-shaped precipitated particles that depending on the pH and hydrogen peroxide concentration may have large faceted surfaces or small faceted protrusions.

In some embodiments of the present invention, wellbore additives and/or wellbore fluids may comprise the precipitated particles described herein. Such wellbore additives and/or wellbore fluids may be used in conjunction with a plurality of wellbore operations. As used herein, the terms "wellbore additive" and "wellbore fluid" refer to any additive or fluid, respectively, suitable for use in conjunction with a wellbore penetrating a subterranean formation and does not imply any particular action by the additive or fluid. Similarly, the term "wellbore operation" refers to any treatment or operation suitable for use in conjunction with a wellbore and/or subterranean formation, e.g., drilling operations, lost circulation operations, fracturing operations, cementing operations, completion operations, and the like.

Figure 1B:
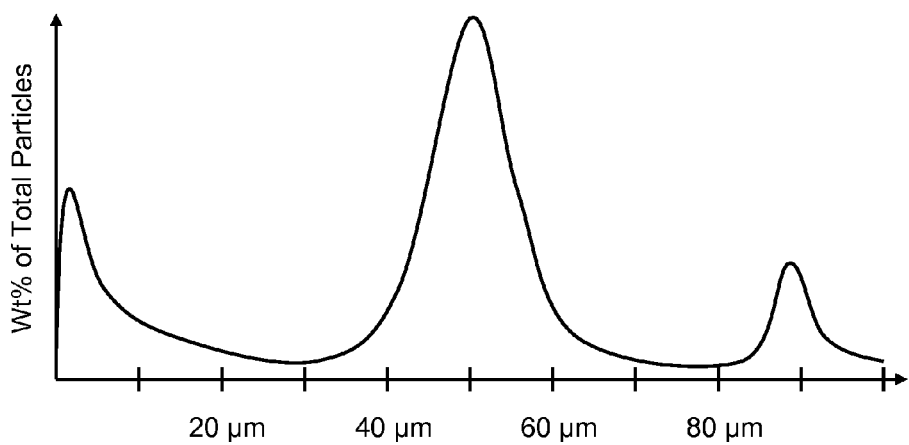

In some embodiments, the wellbore additives and/or the wellbore fluids may comprise the precipitated particles described herein having a multimodal diameter distribution (e.g., bimodal, trimodal, and so on). In some embodiments, the wellbore additives and/or the wellbore fluids may comprise the precipitated particles described herein having a multimodal diameter distribution such that at least one mode has an median diameter (or peak diameter) ranging from a lower limit of about 5 nm, 10 nm, 20 nm, 50 nm, 100 nm, 250 nm, 500 nm, or 1 micron to an upper limit of about 50 microns, 10 microns, 5 microns, 1 micron, or 500 nm and at least one mode has an median diameter ranging from a lower limit of about 10 microns, 25 microns, 50 microns, or 100 microns to an upper limit of about 5000 microns, 2500 microns, 1000 microns, 500 microns, 100 microns, or 50 microns, and wherein each mode may range from any corresponding lower limit to any corresponding upper limit such that at least two distinct modes are present and each range encompasses any corresponding subset therebetween. By way of nonlimiting example, FIGS. 1A-B illustrate theoretical multimodal diameter distributions for use in wellbore fluids. FIG. 1A illustrates a bimodal diameter distribution with a first mode median diameter of about 1 micron and a second mode median diameter of about 25 microns. FIG. 1B illustrates a trimodal diameter distribution with a first mode median diameter of about 5 microns, a second mode median diameter of about 50 microns, and a third mode median diameter of about 90 microns.

In some embodiments, the mode(s) of a diameter distribution may independently be considered to have a narrow diameter distribution. That is, at least one mode of a diameter distribution (including monomodal) may have a standard deviation of about 2% or less of the peak diameter for the given mode (e.g., about 0.1% to about 2% or any subset therebetween). In some embodiments, it is believed that precipitation methods may be advantageously employed to achieve narrow diameter distributions of precipitated particles described herein.

The precipitated particles described herein may be added to a wellbore fluid to achieve a desired density of the wellbore fluid. In some embodiments, the wellbore fluids described herein may have a density between a lower limit of about 7 pounds per gallon ("ppg"), 9 ppg, 12 ppg, 15 ppg, or 22 ppg to an upper limit of about 50 ppg, 40 ppg, 30 ppg, 22 ppg, 20 ppg, or 17 ppg, and wherein the density of the wellbore fluid may range from any lower limit to any upper limit and encompasses any subset therebetween. One of ordinary skill in the art should understand that the ability to achieve a desired density of the wellbore fluid while maintaining a fluid that can be pumped may depend on, inter alia, the composition and specific gravity of the precipitated particles, the shape of the precipitated particles, the concentration of the precipitated particles, and the like, and any combination thereof. For example, wellbore fluids having a density of about 25 ppg or higher may be achieved with precipitated particles having a specific gravity of about 7 or greater (e.g., $BiO_3$ and/or $Bi_2O_3$) and having a shape of spherical, substantially spherical, ovular, substantially ovular, or a hybrid thereof so as to allow for the fluid to be pumpable. In another example, wellbore fluids having a density of about 30 ppg or less may be achieved with precipitated particles having a specific gravity of about 7 or greater and having a larger variety of shapes, including discus.

In some embodiments, a mixture of two or more types of precipitated particles (or a mixture of precipitated and non-precipitated particles) described herein having a multiparticle specific gravity may be added to a wellbore fluid for a desired density. As used herein, the term "multiparticle specific gravity" refers to the calculated specific gravity from Formula I.

$$\text{multiparticle specific gravity} = \text{vol \%}\, A^* sg_A + \text{vol \%}\, B^* sg_B + \ldots \text{vol \%}\, n^* sg_n \quad \text{Formula I}$$

wherein vol % is the volume percent of particle relative to the total volume of the particles used as weighting agent, sg is the specific gravity of the particle, A is the first particle, B is the second particle, and n is the $n^{th}$ particle In some embodiments, the wellbore additives and/or the wellbore fluids may comprise a mixture of precipitated particles described herein having a multiparticle specific gravity ranging from a lower limit of about 3, 4, 4.5, 5, or 5.5 to an upper limit of about 20, 15, 10, 9, 8, or 7, and wherein the multiparticle specific gravity may range from any lower limit to any upper limit and encompasses any subset therebetween. One of ordinary skill in the art with the benefit of this disclosure should understand that when specific gravity is referred to in combination with multiple precipitated particles, specific gravity refers to the multiparticle specific gravity. In some embodiments, the mixture of precipitated particles may comprise at least one precipitated particle and at least one non-precipitated particle (e.g., formed by grinding methods only). Examples of non-precipitated particles may include, but are not limited to, particles having a specific gravity greater than about 2.6 comprising at least one of $BaSO_4$, $CaCO_3$, $(Ca,Mg)CO_3$, $FeCO_3$, $Fe_2O_3$, $\alpha\text{-}Fe_2O_3$, $\alpha\text{-}FeO(OH)$, $Fe_3O_4$, $FeTiO_3$, $(Fe,Mg)SiO_4$, $SrSO_4$, $MnO$, $MnO_2$, $Mn_2O_3$, $Mn_3O_4$, $Mn_2O_7$, $MnO(OH)$, $(Mn^{2+},Mn^{3+})_2O_4$, barite, calcium carbonate, dolomite, hematite, siderite, magnetite, manganese dioxide, manganese (IV) oxide, manganese oxide, manganese tetraoxide, manganese (II) oxide, manganese (III) oxide, $AgI$, $AgCl$, $AgBr$, $AgCuS$, $AgS$, $Ag_2S$, $Ag_3SbS_3$, $AgSbS_2$, $AgSbS_2$, $Ag_5SbS_4$, $(AgFe_2S_3)$, $Ag_3AsS_3$, $Ag_3AsS_3$, $Cu(Ag,Cu)_6Ag_9As_2S_{11}$, $[(Ag,Cu)_6(Sb,As)_2S_7][Ag_9CuS_4]$, $Ag_3AuTe_2$, $(Ag,Au)Te_2$, $Ag_2Te$, $Al_2O_3$, $Al_2SiO_5$, $AsSb$, $(Co, Ni,Fe)As_3$, $PtAs_2$, $AuTe_2$, $BaCO_3$, $BaO$, $BeO$, $Bi$, $BiOCl$, $(BiO)_2CO_3$, $BiO_3$, $Bi_2S_3$, $Bi_2O_3$, $CaO$, $CaF_2$, $CaWO_4$, $CdS$, $CdTe$, $Ce_2O_3$, $CoAsS$, $Co^{+2}Co^{+3}{}_2S_4$, $(Fe,Mg)Cr_2O_4$, $Cr_2O_3$, $Cu$, $CuO$, $Cu_2O$, $CuS$, $Cu_2S$, $CuS_2$, $Cu_9S_5$, $CuFeS_2$, $Cu_5FeS_4$, $CuS.Co_2S_3$, $Cu_3AsO_4(OH)_3$, $Cu_3AsS_4$, $Cu_{12}As_4S_{13}$, $Cu_2(AsO_4)(OH)$, $CuPb_{13}Sb_7S_{24}$, $CuSiO_3.H_2O$, $Fe_3Al_2(SiO_4)_3$, $Fe^{2+}Al_2O_4$, $Fe_2SiO_4$, $FeWO_4$, $FeAs_2$, $FeAsS$, $FeS$, $FeS_2$, $Fe_{(1-x)}S$ (wherein x=0 to 0.2), $(Fe,Ni)_9S_8$, $Fe^{2+}Ni_2{}^{3+}S_4$, $(Fe,Mn)WO_4$, $Fe^{2+}Nb_2O_6$, $(Mn,Fe,Mg)(Al,Fe)_2O_4$, $CaFe^{2+}{}_2Fe^{3+}Si_2O_7O(OH)$, $(YFe^{3+}Fe^{2+}U,Th,Ca)_2(Nb,Ta)_2O_8$, $HgS$, $Hg_2Cl_2$, $MgO$, $MnCO_3$, $Mn_2S$, $Mn_2SiO_4$, $MnWO_4$, $Mn(II)_3Al_2(SiO_4)_3$, $(Na_{0.3}Ca_{0.1}K_{0.1})(Mn^{4+},Mn^{3+})_2O_4.1.5\ H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[O_8|SiO_4]$, $Ca(Mn^{3+},Fe^{3+})_{14}SiO_{24}$, $Ba(Mn^{2+})(Mn^{4+})_8O_{16}(OH)_4$, $CaMoO_4$, $MoS_2$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La)PO_4$, $(Ce,La,Ca)BSiO_5$, $(Ce,La)CO_3F$, $(Y,Ce)CO_3F$, $(U,Ca,Y,Ce)(Ti,Fe)_2$, $NiO$, $NiAs_2$, $NiAs$, $NiAsS$, $Ni_xFe$ (x=2-3), $(Ni,Co)_3S_4$, $NiS$, $PbTe$, $PbSO_4$, $PbCrO_4$, $PbWO_4$, $PbSiO_3$, $PbCO_3$, $(PbCl)_2\ CO_3$, $Pb_5(PO_4)_3Cl$, $Pb_5(AsO_4)_3Cl$, $Pb^{2+}{}_2Pb^{4+O}{}_4$, $Pb_5Au(Te,Sb)_4S_{5-8}$, $Pb_5Sb_8S_{17}$, $PbS$, $Pb_9Sb_8S_{21}$, $Pb_{14}(Sb,As)_6S_{23}$, $Pb_5Sb_4S_{11}$, $Pb_4FeSb_6S_{14}$, $PbCu[(OH)_2|SO_4]$, $PbCuSbS_3$, $(Cu,Fe)_{12}Sb_4S_{13}$, $Sb_2S_3$, $(Sb^{3+},Sb^{5+})O_4$, $Sb_2SnO_5$, $Sc_2O_3$, $SnO$, $SnO_2$, $Cu_2FeSnS_4$, $SrO$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $YPO_4$, $ZnCO_3$, $ZnO$, $ZnFe_2O_4$, $ZnAl_2O_4$, $ZnCO_3$, $ZnS$, $ZnO$, $(Zn_{(1-x)}Fe_{(x)}S)$, $(Zn,Fe)S$, $ZrSiO_4$, $ZrO_2$, $ZrSiO_4$, acanthite, alamandite, allemontite, altaite, aluminum oxide, andalusite, anglesite, antimony sulfide, antimony tin oxide, antimony trioxide, argentite, arsenopyrite, awaruite, barium carbonate, barium oxide, bastnaesite, beryllium oxide, birnessite, bismite, bismuth, bismuth oxycarbonates, bismuth oxychloride, bismuth sulfide, bismuth sulfide, bismuth trioxide, bismuth (III) oxide, bixbyite, bornite, boulangerite, bournonite, brannerite, braunite, bravoite, bromyrite, cadimum sulfide, cadimum telluride, calayerite, calcium oxide, calomel, carrollite, cassiterite, celestine, cerargyrite, cerium oxide, cerussite, cervantite, chalcocite, chalcopyrite, chromite, chromium oxide, cinnabar, clinoclase, cobaltite, columbite, copper, copper oxide, copper sulfide, corundum, covellite, crocoite, cuprite, danaite, digenite, embolite, enargite, euxenite, fayalite, ferberite, fergusonite, ferrous sulfide, franklinite, gahnite, galaxite, galena, geocronite, geothite, gersdorffite, greenockite, hausmmanite, hercynite, hessite, huebnerite, ilmenite, ilvaite, iodyrite, iridosmine, Jacobsite, Jamesonite, krennerite, larsenite, linarite, linnaeite, loellingite, magnesium oxide, manganese carbonate, manganite, manganosite, marcasite, marmatite, menaghinite, miargyrite, microlite, millerite, mimetite, minium, molybdenite, molybdenum (IV) oxide, molybdenum oxide, molybdenum trioxide, monazite, nagyagite, niccolite, nickel oxide, pearceite, pentlandite, perovskite, petzite, phosgenite, phyromorphite, plagionite, polianite, polybasite, polycrase, powellite, proustite, psilomelane, pyrargyrite, pyrite, pyrochlore, pyrolusite, pyrrhotite, rammelsbergite, rutile, samarskite, scandium oxide, scheelite, semsyite, siegenite, skutterudite, smithsonite, spalerite, sperrylite, spessartite, sphalerite, stannite, stephanite, sternbergite, stibnite, stillwellite, stolzite, Stromeyerite, strontium oxide, sylvanite, tantalite, tennantite, tenorite, tephroite, tetrahedrite, thorianite, thorite, tin dioxide, tin (II) oxide, titanium dioxide, turgite, uraninite, vanadinite, vanadium oxide, vanadium trioxide, vanadium (IV) oxide, vanadium (V) oxide, violarite, witherite, wolframite, wulfenite, wurtzite, xenotime, yttrium oxide, zinc carbonate, zincite, zinkenite, zircon, zirconium oxide, zirconium silicate, zinc oxide, and suitable combinations thereof.

The precipitated particles (optionally in combination with non-precipitated particle) may be present in the wellbore fluid in an amount sufficient for a particular application. In certain embodiments, the precipitated particles may be present in a wellbore fluid in an amount up to about 70% by volume of the wellbore fluid (v %) (e.g., about 5 v %, about 15 v %, about 20 v %, about 25 v %, about 30 v %, about 35 v %, about 40 v %, about 45 v %, about 50 v %, about 55 v %, about 60 v %, about 65 v %, etc.). In certain embodiments, the precipitated particles may be present in the wellbore fluid in an amount of 10 v % to about 40 v %.

As described above, the precipitated particles described herein may have tailored characteristics that can be exploited to achieve desired properties and/or capabilities in a wellbore fluid beyond density, e.g., sag control. Particles (e.g., weighting agents, proppants, and cement particles) in wellbore fluids can settle from or migrating within the wellbore fluid therein, which is a condition known as "sag." As used herein, the term "sag" refers to an inhomogeneity in density of a fluid in a wellbore, e.g., along the length of a wellbore and/or the diameter of a deviated wellbores. In some instances, sag can cause to portions of the wellbore fluid to be at an insufficient density to stabilize the wellbore and other portions of the wellbore fluid to have increased density. Unstabilized portions of the wellbore can lead to wellbore collapse and/or pressure buildups that cause blowouts. Increased density can cause wellbore damage (e.g., undesired fracturing of the wellbore), which may show up as pressure increases or decreases when changing from static to flow conditions of the fluid which can cause higher than desired pressures downhole.

In some embodiments, the precipitated particles described herein may be sized, shaped, or otherwise treated (e.g., coated) so as to mitigate sag in wellbore fluids. The size may, inter alia, provide for the formation of a stable suspension that exhibit low viscosity under shear. Further, the specific gravity of the precipitated particles may further allow for such precipitated particles to provide for a desired density of the wellbore fluid while mitigating sag of these precipitated particles or other particles therein.

Sag control can be measured by analyzing density changes in an undisturbed sample of wellbore fluid over time at a typical wellbore temperature (e.g., about 300° F.) and an elevated pressure (e.g., about 5,000 psi to about 10,000 psi). For example, the precipitated particles described herein that provide effective sag control may, in some embodiments, yield wellbore fluids having a change in density of less than about 1 ppg (e.g., about 0.5 ppg change or less including no change in density) when comparing a fluid's original density to the fluid's density at the bottom of a sample having been undisturbed for a given amount of time. In some embodiments, the precipitated particles described herein may provide sag control (i.e., a density change of less than about 1 ppg) over a time ranging from a lower limit of about 10 hours, 24 hours, 36 hours, or 48 hours to an upper limit of about 120 hours, 96 hours, 72 hours, or 48 hours, and wherein the sag control timeframe of the wellbore fluid may range from any lower limit to any upper limit and encompasses any subset therebetween.

In some embodiments, the properties of the precipitated particles described herein may be tailored to achieve sag control. Properties of the precipitated particles that can be tailored to achieve sag control may include, but are not limited to, size (e.g., median diameter of about 2 microns or less or at least one mode of a multimodal distribution having such a peak diameter), shape (e.g., particle shapes with lower sphericity like discus, platelet, flake, acicular, spiked with a substantially spherical or ovular shape, spiked with a discus or platelet shape, fibrous, toroidal, and the like), coatings, linking (described further herein), and the like, and any combination thereof.

In some embodiments, when using two or more precipitated particles with different specific gravities to produce a homogeneous wellbore fluid, the size and shape of each of the precipitated particles may be tailored so as to minimize separation of the precipitated particles, which may lead to a wellbore fluid with a striated density profile. For example, a first precipitated particle with a discus or platelet shape may impede the settling of a second precipitated particle that has a high settling or migration rate (e.g., a higher specific gravity, spherical particle).

In some embodiments, the properties of the precipitated particles described herein may be tailored to mitigate the abrasion of wellbore tools (e.g., pumps, drill bits, drill string, and a casing) as compared to comparable API grade barite (i.e., a comparable wellbore fluid having the same density and/or sag as the wellbore fluid comprising the mineral particles), which may prolong the life of the wellbore tools. It should be noted that the term "wellbore tools" encompasses tools suitable for use in conjunction with wellbore operations, including tools that are used outside of the wellbore, e.g., pumps, shakers, and the like. Abrasion can be measured by the ASTM G75-07 and is reported as a Miller Number or a SAR Number.

Suitable precipitated particles can be those with properties tailored to mitigate abrasion, which may include, but are not limited to, hardness (e.g., a Mohs hardness of less than about 5), size (e.g., median diameter less than about 400 nm or mode of a multimodal distribution having an peak diameter less than about 400 nm), shape (e.g., particle shapes with higher sphericity like spherical, substantially spherical, ovular, substantially ovular, and the like), coatings (e.g., thicker and/or elastic coatings that minimize physical interactions between the mineral portion of the precipitated particle and the wellbore tool), and the like, and any combination thereof. For example, the wellbore fluids may comprise substantially spherical awaruite particles with a median diameter less than about 400 nm and manganese carbonate particles, which have a Mohs hardness less than about 5.

At least some of the mineral particles described herein may, in some embodiments, be capable of being linked by linking agents. Linking of mineral particles may allow for increasing the viscosity of the wellbore fluid or forming a solid mass described further herein. One skilled in the art with the benefit of this disclosure should recognize that, inter alia, the composition of the mineral particles described herein may determine if the mineral particles are suitable for being linked and to what degree they can be linked. Examples of linkable precipitated particles may include, but are not limited to, those that comprise at least one of $Al_2O_3$, $BaCO_3$, $BaO$, $BeO$, $(BiO)_2CO_3$, $BiO_3$, $Bi_2O_3$, $CaO$, $CaCO_3$, $(Ca,Mg)CO_3$, $CdS$, $CdTe$, $Ce_2O_3$, $Cr_2O_3$, $CuO$, $Cu_2O$, $Fe^{2+}Al_2O_4$, $Fe_2SiO_4$, $FeCO_3$, $Fe_2O_3$, $\alpha\text{-}Fe_2O_3$, $\alpha\text{-}FeO(OH)$, $Fe_3O_4$, $FeTiO_3$, $MgO$, $MnCO_3$, $MnO$, $MnO_2$, $Mn_2O_3$, $Mn_3O_4$, $Mn_2O_7$, $MnO(OH)$, $CaMoO_4$, $MoS_2$, $MoO_2$, $MoO_3$, $NbO_4$, $NiO$, $NiAs_2$, $NiAs$, $NiAsS$, $NiS$, $PbCO_3$, $(PbCl)_2CO_3$, $Sb_2SnO_5$, $Sc_2O_3$, $SnO$, $SnO_2$, $SrO$, $SrCO_3$, $SrSO_4$, $TiO_2$, $UO_2$, $V_2O_3$, $VO_2$, $V_2O_5$, $VaO$, $Y_2O_3$, $YPO_4$, $ZnCO_3$, $ZnO$, $ZnFe_2O_4$, $ZnAl_2O_4$, $ZrSiO_4$, $ZrO_2$, $ZrSiO_4$, and any combination thereof. Additionally, in precipitated particles with discrete domains, precipitated particles having any of the foregoing in a domain accessible to be linked may also be suitable.

Examples of linking agents suitable for use in conjunction with the precipitated particles may, in some embodiments, include, but are not limited to, eugenol, guaiacol, methyl guaiacol, salicyladehyde, salicyladimine, salicylic acid, sodium salicylate, acetyl salicylic acid, methyl salicylic acid, methyl acetylsalicylic acid, anthranilic acid, acetyl anthranilic acid, vanillin, derivatized 1,2-dihydroxybenzene (catechol), derivatized or unsubstituted phthalic acid, ortho-phenylenediamine, ortho-aminophenol, ortho-hydroxyphenylacetic acid, alkylsilanes, esters, ethers, and the like, and any combination thereof. Additionally polymers of the foregoing examples, or suitable derivatives thereof, may used as linking agents. For example, vinyl derivatives of the foregoing examples may be used in synthesizing a polymer or copolymer suitable for use as a linking agents. In another example, carboxylated derivates of the foregoing examples may be used in derivatizing a polyamine to yield suitable linking agents. Additional examples may include, but are not limited to, compounds (including polymers and lower molecular weight molecules) having at least two silane moieties, ester moieties, ether moieties, sulfide moieties, amine moieties, and the like, and any combination thereof.

Viscosity increases from linking with linking agents may, in some embodiments, yield wellbore fluids that remain pumpable, wellbore fluids that are non-pumpable, or hardened masses. One skilled in the art with the benefit of this disclosure should understand that the extent of the viscosity increase may depend on, inter alia, the composition of the precipitated particles described herein, the composition of the linking agents, the relative concentration of the precipitated particles and the linking agents, intended use, additional components in the wellbore fluid, and any combination thereof.

In some embodiments, the precipitated particles described herein may advantageously have a higher unconfined compressive strength (e.g., about 1200 psi or greater) that allow for load-bearing applications (e.g., proppant applications). In some embodiments, the precipitated particles described herein may advantageously have a moderate to high unconfined compressive strength (e.g., about 500 psi or greater) that allow for implementation in applications like cements, wellbore strengthening additives, and gravel packs. The unconfined compressive strength of a precipitated particle may depend on, inter alia, the composition of the mineral particle, the shape of the mineral particle, additional processing steps in producing the mineral particle (e.g., calcining after precipitation), and the like, and any combination thereof.

While a plurality of the precipitated particles described herein may have high compressive strength, in some preferred embodiments, such precipitated particles may comprise at least one of $Al_2O_3$, $CaF_2$, $CaWO_4$, $CaCO_3$, $(Ca,Mg)CO_3$, $CuO$, $Cu_2O$, $CuS$, $Cu_2S$, $CuS_2$, $Cu_9S_5$, $CuFeS_2$, $Cu_5FeS_4$, $CuS.Co_2S_3$, $Fe^{2+}Al_2O_4$, $Fe_2SiO_4$, $FeWO_4$, $FeS$, $FeS_2$, $FeCO_3$, $Fe_2O_3$, $\alpha\text{-}Fe_2O_3$, $\alpha\text{-}FeO(OH)$, $Fe_3O_4$, $FeTiO_3$, $MnCO_3$, $Mn_2S$, $MnWO_4$, $MnO$, $MnO_2$, $Mn_2O_3$, $Mn_3O_4$, $Mn_2O_7$, $MnO(OH)$, $CaMoO_4$, $MoO_2$, $MoO_3$, $NiO$, $NiS$, $SnO$, $SnO_2$, $TiO_2$, $ZnCO_3$, $ZnO$, $ZnFe_2O_4$, $ZnAl_2O_4$, $ZnS$, $ZrSiO_4$, $ZrO_2$, $ZrSiO_4$, and any combination thereof.

At least some of the precipitated particles described herein may, in some embodiments, be at least partially degradable. As used herein, the term "degradable" refers to a material being capable of reduced in size by heterogeneous degradation (or bulk erosion) and homogeneous degradation (or surface erosion), and any stage of degradation in between these two. This degradation can be a result of, inter alia, a chemical or thermal reaction, for example, dissolution by an acidic fluid. One skilled in the art with the benefit of this disclosure should recognize that, inter alia, the composition of the precipitated particles described herein may determine if the precipitated particles are degradable and to what extent they are degradable.

While a plurality of the precipitated particles described herein may have be degradable, in some preferred embodiments, degradable precipitated particles may comprise at least one of $BaCO_3$, $(BiO)_2CO_3$, $CaWO_4$, $CaCO_3$, $CuO$, $FeCO_3$, $PbCO_3$, $(PbCl)_2CO_3$, $SrCO_3$, $ZnCO_3$, and any combination thereof.

Degradation of the precipitated described herein may advantageously be used in a plurality of wellbore operations, e.g., cleanup operations (e.g., in removing a filter cake or plug from a lost circulation operation) and cementing operations (e.g., in enhancing the permeability of a cement plug to allow for fluid to flow therethrough while still providing structural strength). Additionally, degradation may be advantageous in reducing the viscosity of a fluid by degrading precipitated particles that contribute to the viscosity (e.g., by shape and/or by linking).

Examples of degradation agents that may be useful in at least partially degrading precipitated particles described herein may, in some embodiments, include, but are not limited to, acid sources (e.g., inorganic acids, organic acid, and polymers that degrade into acids like polylactic acid), alkaline sources (e.g., bases), and oxidizers (e.g., peroxide compounds, permanganate compounds, and hexavalent chromium compounds).

In some embodiments, the precipitated particles described herein may be chosen so as to degrade over a desired amount of time, which may be dependent on, inter alia, particle size, particle shape, wellbore temperature, and precipitated particle composition. For example, calcium carbonate rather than lead carbonate may be utilized, in some embodiments, when for faster degradation. In another example, manganese carbonate may, in some embodiments, be chosen for slower degradation in colder wellbore environments and faster degradation in hotter wellbore environments.

In some embodiments, the precipitated particles described herein may have a coating on at least a portion of the surface of the precipitated particles. As used herein, the term "coating," and the like, does not imply any particular degree of coating on the particle. In particular, the terms "coat" or "coating" do not imply 100% coverage by the coating on the particle. Further, a coating may, in some embodiments, be covalently and/or noncovalently associate with the precipitated particles described herein.

In some embodiments, a coating suitable for use in conjunction with the precipitated particles described herein may include, but are not limited to, polymers, surfactants, and any combination thereof. Coatings may, in some embodiments, assist in the suspension of the precipitated particles and/or the compatibility of the precipitated particles with a wellbore fluid and/or wellbore operation. For example, a coating like an alkyl amine may, in some embodiments, associate with the surface of the precipitated particles so as to render the precipitated particle more hydrophobic, which may enhance the suspendability of the precipitated particles in oil-based fluids.

In some embodiments, precipitated particles may be coated after addition to the wellbore fluid.

In some embodiments, a coating may be applied during production of the precipitated particles described herein. For example, grinding production methods may, in some embodiments, be conducted in the presence of polymers, surfactants, or the like suitable for use as a coating. Additionally, in some embodiments, precipitation production methods may be conducted in the presence of polymers, surfactants, or the like suitable for use as a coating. One skilled in the art with the benefit of this disclosure should understand that including polymers, surfactants, or the like in a production method of the precipitated particles described herein should be chosen so as not to significantly impact the production in a negative manner.

Polymers suitable for use in conjunction with the coated precipitated particles described herein may, in some embodiments, have a molecular weight ranging from a lower limit of about 10,000 g/mol, 25,000 g/mol, 100,000 g/mol, or 250,000 g/mol to an upper limit of about 2,000,000 g/mol, 1,000,000 g/mol, 500,000 g/mol, or 250,000 g/mol, and wherein the molecular weight may range from any lower limit to any upper limit and encompasses any subset therebetween.

In some embodiments, coating may comprise the polymers list herein that may be useful as morphology modifiers. In some embodiments, the polymers may be used as morphology modifiers any yield coated precipitated particles. In other instances, the precipitated particles may be formed and then polymers suitable for use as morphology modifiers may be used as coatings.

In some embodiments, coatings may comprise consolidating agents that generally comprise any compound that is capable of minimizing particulate migration once placed, which may be suitable for methods and compositions relating to proppant packs, gravel packs, and the like. Suitable consolidating agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, and binders. Combinations and/or derivatives of these also may be suitable. Nonlimiting examples of suitable non-aqueous tackifying agents may be found in U.S. Pat. Nos. 7,392,847, 7,350,579, 5,853,048; 5,839,510; and 5,833,000, the entire disclosures of which are herein incorporated by reference. Nonlimiting examples of suitable aqueous tackifying agents may be found in U.S. Pat. Nos. 8,076,271, 7,131,491, 5,249,627 and 4,670,501, the entire disclosures of which are herein incorporated by reference. Nonlimiting examples of suitable crosslinkable aqueous polymer compositions may be found in U.S. Patent Application Publication No. 2010/0160187 and U.S. Pat. No. 8,136,595 the entire disclosures of which are herein incorporated by reference. Nonlimiting examples of suitable silyl-modified polyamide compounds may be found in U.S. Pat. No. 6,439,309 entitled the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. 2008/0006405 and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0179281, and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

In some embodiments, the wellbore additives may comprise the precipitated particles described herein and optionally further comprise other particles and/or additional components suitable for use in a specific wellbore operation (e.g., proppants and cement particles as described further herein). Wellbore additives may, in some embodiments, be dry powder or gravel, a liquid with a high concentration of the precipitated particles described herein (e.g., a slurry), and the like.

As described herein, in some embodiments, it may be advantageous to include a combination of types of precipitated particles described herein so as to achieve a wellbore fluid with desired properties and/or capabilities. The ratio of the various particles may depend on, inter alia, the desired properties and/or characteristics of the wellbore fluid.

Distinctions between types of precipitated particles may, in some embodiments, be defined by at least one of mineral composition, production method, median diameter, diameter distribution, presence or absence of coating, coating composition, and the like, and any combination thereof. As such, achieving homogeneous mixtures of dry wellbore additives may be aided by inclusion of a dry lubricant to facilitate homogeneous mixing and flowability. Examples of dry lubricant may, in some embodiments, include, but are not limited to, molybdenum disulfide, graphite, boron nitride, tungsten disulfide, polytetrafluoroethylene particles, bismuth sulfide, bismuth oxychloride, and the like, and any combination thereof. In some embodiments, a dry lubricant may advantageously have a specific gravity greater than about 2.6 (e.g., molybdenum disulfide, tungsten disulfide, bismuth sulfide, and bismuth oxychloride) so as contribute to the density of the resultant wellbore fluid.

Examples of base fluids suitable for use in conjunction with the wellbore fluids may, in some embodiments, include, but are not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof.

Suitable water-in-oil emulsions, also known as invert emulsions, may have an oil-to-water ratio from a lower limit of greater than about 30:70, 40:60, 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997, U.S. Pat. No. 5,977,031 entitled "Ester Based Invert Emulsion Drilling Fluids and Muds Having Negative Alkalinity" filed on Aug. 8, 1998, U.S. Pat. No. 6,828,279 entitled "Biodegradable Surfactant for Invert Emulsion Drilling Fluid" filed on Aug. 10, 2001, U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, U.S. Pat. No. 7,645,723 entitled "Method of Drilling Using Invert Emulsion Drilling Fluids" filed on Aug. 15, 2007, and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

In some embodiments, the wellbore fluids described herein may be foamed. As used herein, the term "foam" refers to a two-phase composition having a continuous liquid phase and a discontinuous gas phase. In some embodiments, the wellbore fluids may comprise a base fluid, the precipitated particles described herein, a gas, and a foaming agent.

Examples of gases may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particle transport capability, up to about 12 lb of particles per gal of wellbore fluid.

In some embodiments, the quality of a wellbore fluid that is foamed may range from a lower limit of about 5%, 10%, 25%, 40%, 50%, 60%, or 70% gas volume to an upper limit of about 95%, 90%, 80%, 75%, 60%, or 50% gas volume, and wherein the quality may range from any lower limit to any upper limit and encompasses any subset therebetween. Most preferably, the wellbore fluid that is foamed may have a foam quality from about 85% to about 95%, or about 90% to about 95%.

Examples of foaming agents may include, but are not limited to, cationic foaming agents, anionic foaming agents, amphoteric foaming agents, nonionic foaming agents, or any combination thereof. Nonlimiting examples of suitable foaming agents may, in some embodiments, include, but are not limited to, surfactants like betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, the wellbore additives and/or the wellbore fluids described herein may optionally further comprise additional components, e.g., filler particles, salts, inert solids, fluid loss control agents, emulsifiers, dispersion aids, corrosion inhibitors, emulsion thinners, emulsion thickeners, viscosifying agents, gelling agents, crosslinking agents, surfactants, cement particulates, proppants, gravel particulates, lost circulation materials, pH control additives, breakers, defoaming agents, biocides, stabilizers, scale inhibitors, gas hydrate inhibitors, oxidizers, reducers, friction reducers, clay stabilizing agents, set accelerators, set retarders, and combinations thereof. One skilled in the art with the benefit of this disclosure should understand the appropriate composition, concentration, and combination of individual additional components that may be included in the wellbore additives and/or the wellbore fluids that comprise the precipitated particles described herein.

The wellbore additives and/or the wellbore fluids described herein may be used in a plurality of wellbore operations. Examples of wellbore operations may, in some embodiments, include, but are not limited to, drilling operations, managed-pressure drilling operations, dual-gradient drilling, tripping operations, logging operations, lost circulation operations, stimulation operations, sand control operations, completion operations, acidizing operations, scale inhibiting operations, water-blocking operations, clay stabilizer operations, fracturing operations, gravel packing operations, wellbore strengthening operations, and sag control operations. The wellbore additives and/or the wellbore fluids described herein may, in some embodiments, be used in full-scale operations or pills. As used herein, a "pill" is a type of relatively small volume of specially prepared wellbore fluid placed or circulated in the wellbore.

Some embodiments may involve circulating a wellbore fluid that comprises a base fluid and precipitated particles described herein in a wellbore such that the wellbore fluid has a desired density and optionally a desired level of sag control. In some instances, the wellbore fluid may be a drilling fluid, a wellbore strengthening fluid, a cementing fluid, a fracturing fluid, a plugging fluid, completion fluids, and the like and used in corresponding wellbore operations. In some instances, the wellbore fluid may further comprise other particles like a non-precipitated weighting agent particles, proppant particles, cement particles, lost circulation particles, and the like, and any combination thereof. In some instances, the precipitated particles may be a single type or multiple types of precipitated particles.

In some embodiments, the precipitated particles described herein may be useful in drilling operations. Some embodiments may involve drilling a wellbore penetrating a subterranean formation with a wellbore fluid that comprises precipitated particles described herein. In some embodiments, the precipitated particles described herein may be useful in at least one of: suspending wellbore cuttings (e.g., by contributing to the fluid viscosity and/or sag control), maintaining wellbore pressure (e.g., by contributing to sag control), incorporating into filter cakes that provide fluid loss control, and the like. Further, precipitated particles described herein may be chosen to mitigate abrasion of wellbore tools utilized during drilling.

In some embodiments, the precipitated particles described herein may be useful in drilling operations. Some embodiments may involve drilling a wellbore penetrating a subterranean formation with a wellbore fluid that comprises precipitated particles described herein. In some embodiments, the precipitated particles described herein may be useful in at least one of: suspending wellbore cuttings (e.g., by contributing to the fluid viscosity and/or sag control), maintaining wellbore pressure (e.g., by contributing to sag control), incorporating into filter cakes that provide fluid loss control, and the like. Further, precipitated particles described herein may be chosen to mitigate abrasion of wellbore tools utilized during drilling.

In some embodiments, the precipitated particles described herein may be used in cementing operations. As used herein, the term "cementing operations" refers to operations where a composition is placed in a wellbore and/or a subterranean formation and sets therein to form a hardened mass, which encompasses hydraulic cements, construction cements, linked precipitated particles described herein, and some polymeric compositions that set (e.g., polymers like epoxies and latexes).

Examples of cementing operations that may utilize the precipitated particles described herein may, in some embodiments, include, but are not limited to, primary cementing operations (e.g., forming cement sheaths in a wellbore annulus or forming wellbore plugs for zonal isolation or fluid diversion) and remedial cementing operations (e.g., squeeze operations, repairing and/or sealing microannuli and/or cracks in a hardened mass, or forming plugs). In cementing operations, a plurality of fluids are often utilized including, but not limited to, cementing fluids (sometimes referred to as settable compositions), spacer fluids, and displacement fluids. For example, a cementing operation may utilize, in order, (1) a first spacer fluid, (2) a cementing fluid, optionally (3) a second spacer fluid, and (4) a displacement fluid, each of which may independently be a wellbore fluid comprising precipitated particles described herein.

In some embodiments, cementing operations may utilize a plurality of fluids in order such that each subsequent fluid has a higher density than the previous fluid. Achieving the desired density for a wellbore fluid in a cementing operation may, in some embodiments, involve the use of precipitated particles described herein. Further, as described herein, the precipitated particles utilized in such wellbore fluids may be chosen to achieve other properties and/or capabilities in the wellbore fluids. It should be noted that in a cementing operation when a plurality of wellbore fluids are used, each wellbore fluid may be independently designed with precipitated particles described herein and do not necessarily require the use of the same precipitated particle in each of the wellbore fluids or the use of a precipitated particle described herein in all of the wellbore fluids. For example, the first spacer fluid may include fluorite, the cementing fluid may include precipitated manganese oxide, and the second spacer may include precipitated copper oxide.

One of ordinary skill in the art should understand the plurality of uses of the precipitated particles described herein and the appropriate incorporation into the wellbore fluids suitable for use in conjunction with cementing operations. For example, cementing fluids, spacer fluids, and/or displacement fluids, may comprise precipitated particles described herein so as to achieve a desired density, a desired level of sag control, and/or a desired viscosity. In another example, linkable precipitated particles may be included in the cementing fluids and utilized so as to yield hardened masses that comprise linked precipitated particles. In yet another example, degradable precipitated particles may be included in the cementing fluids and utilized so as to yield hardened masses that that can be at least partially degraded. Further, depending on the composition of the precipitated particle, combinations of the foregoing examples may be appropriate, e.g., precipitated particles comprising manganese carbonate may be useful in cementing fluids to achieve a desired density and a desired level of sag control, to link in forming the hardened mass, and to degrade for increasing the permeability of the hardened mass.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   circulating a wellbore fluid in a wellbore penetrating a subterranean formation, the wellbore fluid having a density of about 7 ppg to about 50 ppg and comprising a base fluid and a plurality of precipitated particles having a shape selected from the group consisting of ovular, substantially ovular, discus, platelet, flake, toroidal, dendritic, acicular, spiked with a substantially spherical or ovular shape, spiked with a discus or platelet shape, rod, fibrous, polygonal, faceted, and star shaped, wherein individual particles of the plurality of precipitated particles comprise a substantially homogenous domain of two or more precipitates selected from the group consisting of $BaCO_3$, $BaSO_4$, $BaCrO_4$, $BaO$, $CaO$, $CaCO_3$, $FeS$, $FeS_2$, $FeCO_3$, $Fe_2O_3$, $\alpha\text{-}Fe_2O_3$, $\alpha\text{-}FeO(OH)$, $Fe_3O_4$, $MnCO_3$, $Mn_2S$, $MnO$, $MnO_2$, $Mn_2O_3$, $Mn_3O_4$, $Mn_2O_7$, $MnO(OH)$, $PbSO_4$, $PbCrO_4$, $PbCO_3$, $Pb^{2+}{}_2Pb^{4+}O_4$, $SnO$, $SnO_2$, $SrO$, $SrCO_3$, $SrSO_4$, $ZnO$, $ZnFe_2O_4$, and $ZnS$.

2. The method of claim 1, wherein the wellbore fluid has a sag control of a density change of less than about 1 ppg over a time of about 10 hours to about 120 hours.

3. The method of claim 1, wherein the precipitated particles have a specific gravity of about 2.6 to about 20.

4. The method of claim 1, wherein the precipitated particles have a specific gravity of about 5.5 to about 20.

5. The method of claim 1, wherein the precipitated particles have a median diameter of about 5 nm to about 100 microns.

6. The method of claim 1 further comprising drilling the wellbore while circulating the wellbore fluid.

7. The method of claim 1, wherein the wellbore fluid further comprises a plurality of second particles, the second particles being precipitated or non-precipitated.

8. The method of claim 7, wherein the precipitated particles in combination with the second particles have a multiparticle specific gravity of about 3 to about 20.

9. The method of claim 7, wherein the precipitated particles in combination with the second particles have a diameter distribution that has at least one mode with a standard deviation of about 2% or less of a peak diameter of the at least one mode.

10. The method of claim 7, wherein the precipitated particles in combination with the second particles have a multimodal diameter distribution.

11. The method of claim 1, wherein the plurality of precipitated particles comprise calcined precipitated particles.

12. A method comprising:
   circulating a wellbore fluid in a wellbore penetrating a subterranean formation, the wellbore fluid having a density of about 7 ppg to about 50 ppg and comprising a base fluid and a plurality of precipitated particles having a shape selected from the group consisting of ovular, substantially ovular, discus, platelet, flake, toroidal, dendritic, acicular, spiked with a substantially spherical or ovular shape, spiked with a discus or platelet shape, rod, fibrous, polygonal, faceted, and star shaped, wherein individual particles of the plurality of precipitated particles comprise barium carbonate precipitated on calcium carbonate particles.

13. The method of claim 12, wherein the precipitated particles have a specific gravity of about 5.5 to about 20.

14. A method comprising:
   circulating a wellbore fluid in a wellbore penetrating a subterranean formation, the wellbore fluid having a density of about 7 ppg to about 50 ppg and comprising a base fluid and a plurality of precipitated particles having a shape selected from the group consisting of ovular, substantially ovular, discus, platelet, flake, toroidal, dendritic, acicular, spiked with a substantially spherical or ovular shape, spiked with a discus or platelet shape, rod, fibrous, polygonal, faceted, and star shaped, wherein individual particles of the plurality of precipitated particles comprise at least one selected from the group consisting of: $(Ba,Sr)SO_4$, $(Ba,Sr)CO_3$, and $Ba(SO_4, CrO_4)$.

* * * * *